US012393597B1

(12) United States Patent
Rolland et al.

(10) Patent No.: US 12,393,597 B1
(45) Date of Patent: Aug. 19, 2025

(54) METHODS AND SYSTEMS FOR DYNAMIC QUERY-DEPENDENT WEIGHTING OF EMBEDDINGS IN HYBRID SEARCH

(71) Applicant: Shopify Inc., Ottawa (CA)

(72) Inventors: Amélie Rolland, Québec City (CA); Alexandre Gariépy, Québec City (CA); Marc-Antoine Bélanger, Montréal (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 18/636,724

(22) Filed: Apr. 16, 2024

(51) Int. Cl.
*G06F 16/00* (2019.01)
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC .................. G06F 16/24578; G06F 16/248
See application file for complete search history.

(56) References Cited

U.S. PATENT DOCUMENTS

| | | | | |
|---|---|---|---|---|
| 8,954,424 | B2* | 2/2015 | Gupta | G06F 16/3334 |
| | | | | 707/723 |
| 11,971,885 | B2* | 4/2024 | Chen | G06N 3/04 |
| 12,086,198 | B2* | 9/2024 | Basu | G06F 16/953 |
| 12,141,186 | B1* | 11/2024 | Tomar | G06F 16/355 |
| 12,164,510 | B2* | 12/2024 | Larchev | G06F 16/951 |
| 2012/0246156 | A1* | 9/2012 | Gupta | G06F 16/3334 |
| | | | | 707/E17.082 |
| 2020/0004886 | A1* | 1/2020 | Ramanath | G06F 16/248 |
| 2021/0004359 | A1* | 1/2021 | Gungor | G06F 11/3409 |
| 2021/0342389 | A1* | 11/2021 | Maheshwari | G06N 20/00 |
| 2022/0253435 | A1* | 8/2022 | Chen | G06N 3/08 |
| 2024/0020321 | A1* | 1/2024 | Mosenia | G06F 16/24578 |
| 2024/0111794 | A1* | 4/2024 | Osuala | G06F 16/3323 |
| 2024/0289554 | A1* | 8/2024 | Galli | G06F 16/954 |
| 2024/0311375 | A1* | 9/2024 | Bisti | G06F 8/20 |
| 2024/0311421 | A1* | 9/2024 | Lathia | G06F 16/538 |
| 2024/0362267 | A1* | 10/2024 | Dong | G06V 10/82 |
| 2024/0378209 | A1* | 11/2024 | Don | G06F 16/24578 |
| 2024/0386015 | A1* | 11/2024 | Crabtree | G06F 16/9024 |

* cited by examiner

*Primary Examiner* — Noosha Arjomandi
(74) *Attorney, Agent, or Firm* — Smart & Biggar LP

(57) ABSTRACT

Methods and systems for optimally weighting search results in a hybrid search framework are described. Responsive to a search query, query embeddings are obtained using corresponding embedding generators. The query embeddings are provided to search operators corresponding to the embedding generators to obtain corresponding search result sets having search results and associated scores. Optimal weights for each of the corresponding embedding generators are determined using a machine learning model, based on the search query. The search result sets are combined, based on the determined weights and the associated scores, yielding a combined search result set. The disclosed methods and systems dynamically optimize weights applied to search result sets that are retrieved using more than one vector-based search operator (e.g., where each search operator performs a vector-based search using embeddings generated by a corresponding embedding generator), for generating more relevant search results within the hybrid search framework.

20 Claims, 7 Drawing Sheets

METHODS AND SYSTEMS FOR DYNAMIC QUERY-DEPENDENT WEIGHTING OF EMBEDDINGS IN HYBRID SEARCH

FIELD

The present disclosure relates to machine learning, and, more particularly, to search systems including hybrid search, and, yet more particularly, to the use of dynamic query-dependent weighting of embeddings in hybrid search.

BACKGROUND

Users interact with a search engine to retrieve desired information. Common search approaches include keyword or lexical search and semantic search. Keyword or lexical search compares words or phrases in a search query with content in a corpus of text and returns search results based on finding exact matches. Semantic search uses natural language processing (NLP) to analyze the available context of a query and returns search results based on a perceived relevance to the user's intent.

Hybrid search is a search technique that combines two search approaches to improve the accuracy and relevance of search results. A common hybrid search approach combines keyword or lexical search and semantic search.

SUMMARY

A method and system for optimally weighting search results retrieved using more than one vector-based search operator are provided. A dynamic weighting module includes two or more embedding generators that transform a natural language search query into corresponding query embeddings. Each embedding generator may correspond to a respective different embedding model (e.g., one embedding generator may correspond to a textual embedding model and a second embedding generator may correspond to an image embedding model). The query embeddings are provided to search operators corresponding to the embedding generators (where a search operator may also be referred to as search model, search algorithm etc.) to obtain corresponding search result sets having search results and associated scores. For example, a query embedding (for a given search query) obtained from a textual embedding model may be provided to a search operator that operates on textual embeddings, and another query embedding (for the same given search query) obtained from an image embedding model may be provided to another search operator that operates on image embeddings. In this way different search result sets may be obtained from different search operators using different query embeddings for the same search query. A machine learning (ML) model is trained to predict a weighting factor corresponding to each of the embedding generators based on the search query (e.g., where each embedding generator corresponds to a respective different embedding model). The trained ML model is used to determine optimal weights for the search result sets obtained from each of the corresponding search operators, based on the search query. For example, the trained ML model dynamically generates optimal weights at query time, for applying to the search result sets obtained from each of the corresponding search operators. The search result sets are combined, based on the determined weights and the associated scores, yielding a combined search result set that may be displayed on a user device. In this regard, search results retrieved using more than one vector-based search operator may be optimally weighted, for generating more relevant search result sets within a hybrid search framework.

Existing hybrid search approaches combine a lexical-based (e.g., keyword) search operator for obtaining sparse representations of the query, and a vector-based search operator for obtaining dense representations of the query, to produce a single set of results for a given query. In this regard, the dense vector representations may capture semantic similarity and sparse representations and/or keyword matches may add a boosting score for increased search precision.

Typically, a single embedding model is used in hybrid search frameworks for obtaining the dense representations. However, as different embedding models are each specialized in encoding different features of an object, they may perform differently when presented with the same input (e.g., a search query). For example, in response to a search query using language commonly found in product specifications or other documents, a traditional hybrid search engine may produce more relevant results when the dense representations correspond to a textual embedding model, whereas in response to a search query using language that may be more effectively captured in images, the hybrid search engine may produce more relevant results when the dense representations correspond to an image embedding model. As such, hybrid search engines may benefit from incorporating more than one embedding model in the vector-based search operator for retrieving more relevant search results.

A limitation of current approaches for combining textual and image-based vector search operators within a hybrid search framework is that a respective scoring weight to the results of vector similarity searches from both textual and image embeddings are generally arbitrarily set and are typically fixed, resulting in sub-optimal search outcomes for certain queries. For example, selecting what weight to assign each set of results becomes a challenge when the number and format of possible input queries are unbounded. Use of fixed or static weights can also be problematic because some queries may benefit more from a keyword or lexical search (thus textual-based vector searches should be weighted more heavily) whereas other queries may benefit more from an image search (thus image-based vector searches should be weighted more heavily). As an alternative approach, the use of a single multimodal vector search operator (e.g., Large Language-and-Vision Assistant (LLaVA), among others) within a hybrid search framework may enable the creation of both an image embedding and a textual embedding associated with a search query, for performing vector similarity searches using both textual and image embeddings. However, the use of multimodal vector search operators remain limited by fixed weights for each modality, for example, the weights of each modality cannot be adjusted based on the query.

In various examples, the present disclosure provides a technical solution for implementing a hybrid search framework that addresses at least some of the above drawbacks. Examples of the disclosed dynamic weighting module may improve hybrid search engine performance by incorporating two or more different vector-based search operators for encoding both textual and image information about objects (e.g., products, websites, items etc.). Further, the disclosed dynamic weighting module dynamically determines the weights for weighting search result sets that are retrieved using more than one vector-based search operator within the hybrid search framework, based on a search query.

Examples of the disclosed dynamic weighting module may improve the performance of hybrid search engines by improving the quality and relevance of returned search results. By dynamically adjusting the weights for text and image embeddings, the system can leverage the unique advantages and semantic understanding capabilities of various types of embedding models, to capture different object features and deliver more relevant results. Improving the accuracy, quality and efficiency of returned search results may increase computing efficiency, for example, by reducing the number of search queries and subsequent results pages and reducing the use of computing resources (e.g., processing power, memory, computing time, etc.) needed for arriving at a desired search result.

In various examples, the present disclosure provides a technical solution that enables the weight predictor model to dynamically update the predicted weights based on a user interaction during a search session, causing the re-ranking and/or re-ordering of already obtained search results according to the interaction, without re-running the search operators. In this regard, refining the initial search results by re-ranking or re-ordering may improve the computing efficiency of the search engine, by using simple arithmetic and sorting operations, and avoiding the re-computation of embedding vectors in order to re-order the results.

In some examples, the present disclosure describes a computer-implemented method. The method includes a number of steps, including: receiving, from a user device, a search query; obtaining query embeddings based on the search query, the query embeddings being generated by corresponding embedding generators; providing the query embeddings to search operators corresponding to the embedding generators to obtain corresponding search result sets having search results and associated scores; determining weights for each of the corresponding embedding generators, based on the search query, using a machine learning model; combining the search result sets based on the determined weights and the associated scores, yielding a combined search result set; and transmitting a signal to cause a display of the user device to provide output based on the combined search result set.

In an example of the preceding example aspect of the method, wherein the machine learning model has been trained to predict a set of weights corresponding to the embedding generators, based on the search query.

In an example of a preceding example aspect of the method, further comprising: prior to determining weights for each of the corresponding embedding generators: training the machine learning model using a training dataset comprising: historical queries and corresponding optimal two or more embedding generator weighting factors associated with two or more respective embedding generators.

In an example of the preceding example aspect of the method, further comprising: generating the training dataset by: obtaining a plurality of historical search queries, each of the historical search queries being associated with at least one historically interacted-with search result; for each historical search query of the plurality of historical search queries: performing a plurality of test searches, each test search performed using a candidate weight value for each of the two or more embedding generators; determining, for each of the plurality of test searches, a ranking of the historically interacted-with search result in a respective set of returned test search results; and determining the optimal embedding generator weighting factor for each of the two or more embedding generators, based on the ranking.

In an example of a preceding example aspect of the method, wherein the query embeddings include: a textual query embedding generated by encoding the search query using a textual embedding generator; and an image query embedding generated by encoding the search query using a multimodal embedding generator.

In an example of the preceding example aspect of the method, wherein providing the query embeddings to search operators corresponding to the embedding generators to obtain corresponding search result sets comprises: comparing the textual query embedding with a plurality of stored text embeddings to determine a plurality of respective text embedding similarity scores, each of the respective text embedding similarity scores representative of a similarity between the textual query embedding and a respective one of the plurality of stored text embeddings; generating a first set of candidates, based on the text embedding similarity scores; comparing the image query embedding with a plurality of stored image embeddings to determine a plurality of respective image embedding similarity scores, each of the respective image embedding similarity scores representative of a similarity between the image query embedding and a respective one of the plurality of stored image embeddings; and generating a second set of candidates, based on the plurality of image embedding similarity scores, wherein the first set of search results comprises the first set of candidates and the second set of candidates.

In an example of the preceding example aspect of the method, wherein combining the search result sets comprises: for candidates represented in the first set of candidates, multiplying corresponding text embedding similarity scores with a textual embedding generator weighting factor to generate corresponding weighted text embedding similarity scores; for candidates represented in the second set of candidates, multiplying corresponding image embedding similarity scores with a multimodal embedding generator weighting factor to generate corresponding weighted image embedding similarity scores; for candidates represented in both the first set of candidates and the second set of candidates, adding corresponding weighted text embedding similarity scores and corresponding weighted image embedding similarity scores, to generate corresponding weighted text-image embedding similarity scores; and ranking the first set of candidates and the second set of candidates based on the weighted text embedding similarity scores, the weighted image embedding similarity scores and the weighted text-image embedding similarity scores, to obtain the combined search result set.

In an example of the preceding example aspect of the method, wherein ranking the first set of candidates and the second set of candidates comprises: ordering the first set of candidates and the second set of candidates based on the weighted text embedding similarity scores, the weighted image embedding similarity scores and the weighted text-image embedding similarity scores, wherein candidates that are present in both the first set of candidates and the second set of candidates are ordered based on the corresponding weighted text-image embedding similarity scores, and candidates that are present in either of but not both of the first set of candidates or the second set of candidates are ordered based on either the corresponding weighted text embedding similarity scores or the corresponding weighted image embedding similarity scores; and ranking the candidates in the combined search result set based on the ordering, where higher rankings are associated with higher similarity scores, wherein the combined search result set comprises a predetermined number of the highest-ranking candidates.

In an example of a preceding example aspect of the method, further comprising: receiving a search modifier associated with the search query, from the user device; determining, using the machine learning model, a set of updated weights based on the search query and the search modifier; and modifying the list of search results, based on the first set of search results and the set of updated weights.

In an example of the preceding example aspect of the method, wherein the search modifier is at least one of: a category; a filter; a metadata related to a user search session; or a metadata related to a user account.

In some examples, the present disclosure describes a computer system including: a processing unit configured to execute computer-readable instructions to cause the system to: receive, from a user device, a search query; obtain query embeddings based on the search query, the query embeddings being generated by corresponding embedding generators; provide the query embeddings to search operators corresponding to the embedding generators to obtain corresponding search result sets having search results and associated scores; determine weights for each of the corresponding embedding generators, based on the search query, using a machine learning model; combine the search result sets based on the determined weights and the associated scores, yielding a combined search result set; and transmit a signal to cause a display of the user device to provide output based on the combined search result set.

In an example of the preceding example aspect of the system, wherein the machine learning model has been trained to predict a set of weights corresponding to the embedding generators, based on the search query.

In an example of a preceding example aspect of the system, wherein the processing unit is further configured to execute computer-readable instructions to cause the computer system to, prior to determining weights for each of the corresponding embedding generators: train the machine learning model using a training dataset comprising: historical queries and corresponding optimal two or more embedding generator weighting factors associated with two or more respective embedding generators.

In an example of the preceding example aspect of the system, wherein the processing unit is further configured to execute computer-readable instructions to cause the computer system to: generate the training dataset by: obtaining a plurality of historical search queries, each of the historical search queries being associated with at least one historically interacted-with search result; for each historical search query of the plurality of historical search queries: performing a plurality of test searches, each test search performed using a candidate weight value for each of the two or more embedding generators; determining, for each of the plurality of test searches, a ranking of the historically interacted-with search result in a respective set of returned test search results; and determining the optimal embedding generator weighting factor for each of the two or more embedding generators, based on the ranking.

In an example of a preceding example aspect of the system, wherein the query embeddings include: a textual query embedding generated by encoding the search query using a textual embedding generator; and an image query embedding generated by encoding the search query using a multimodal embedding generator.

In an example of the preceding example aspect of the system, wherein in providing the query embeddings to search operators corresponding to the embedding generators to obtain corresponding search result sets, the processing unit is further configured to execute computer-readable instructions to cause the computer system to: compare the textual query embedding with a plurality of stored text embeddings to determine a plurality of respective text embedding similarity scores, each of the respective text embedding similarity scores representative of a similarity between the textual query embedding and a respective one of the plurality of stored text embeddings; generate a first set of candidates, based on the text embedding similarity scores; compare the image query embedding with a plurality of stored image embeddings to determine a plurality of respective image embedding similarity scores, each of the respective image embedding similarity scores representative of a similarity between the image query embedding and a respective one of the plurality of stored image embeddings; and generate a second set of candidates, based on the plurality of image embedding similarity scores, wherein the first set of search results comprises the first set of candidates and the second set of candidates.

In an example of the preceding example aspect of the system, wherein in combining the search result sets, the processing unit is further configured to execute computer-readable instructions to cause the computer system to: for candidates represented in the first set of candidates, multiply corresponding text embedding similarity scores with a textual embedding generator weighting factor to generate corresponding weighted text embedding similarity scores; for candidates represented in the second set of candidates, multiply corresponding image embedding similarity scores with a multimodal embedding generator weighting factor to generate corresponding weighted image embedding similarity scores; for candidates represented in both the first set of candidates and the second set of candidates, add corresponding weighted text embedding similarity scores and corresponding weighted image embedding similarity scores, to generate corresponding weighted text-image embedding similarity scores; and rank the first set of candidates and the second set of candidates based on the weighted text embedding similarity scores, the weighted image embedding similarity scores and the weighted text-image embedding similarity scores, to obtain the combined search result set.

In an example of the preceding example aspect of the system, wherein in ranking the first set of candidates and the second set of candidates, the processing unit is further configured to execute computer-readable instructions to cause the computer system to: order the first set of candidates and the second set of candidates based on the weighted text embedding similarity scores, the weighted image embedding similarity scores and the weighted text-image embedding similarity scores, wherein candidates that are present in both the first set of candidates and the second set of candidates are ordered based on the corresponding weighted text-image embedding similarity scores, and candidates that are present in either of but not both of the first set of candidates or the second set of candidates are ordered based on either the corresponding weighted text embedding similarity scores or the corresponding weighted image embedding similarity scores; and rank the candidates in the combined search result set based on the ordering, where higher rankings are associated with higher similarity scores, wherein the combined search result set comprises a predetermined number of the highest-ranking candidates.

In an example of a preceding example aspect of the system, wherein the processing unit is further configured to execute computer-readable instructions to cause the computer system to: receive a search modifier associated with the search query, from the user device; determine, using the machine learning model, a set of updated weights based on the search query and the search modifier; and modify the list of search results, based on the first set of search results and the set of updated weights.

In some examples, the present disclosure describes a non-transitory computer-readable medium storing instructions that, when executed by a processing unit of a computing system, cause the computing system to: receive, from a user device, a search query; obtain query embeddings based on the search query, the query embeddings being generated by corresponding embedding generators; provide the query embeddings to search operators corresponding to the embedding generators to obtain corresponding search result sets having search results and associated scores; determine weights for each of the corresponding embedding generators, based on the search query, using a machine learning model; combine the search result sets based on the determined weights and the associated scores, yielding a combined search result set; and transmit a signal to cause a display of the user device to provide output based on the combined search result set.

In some examples, the computer-readable medium may store instructions that, when executed by the processor of the computing system, cause the computing system to perform any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1A:
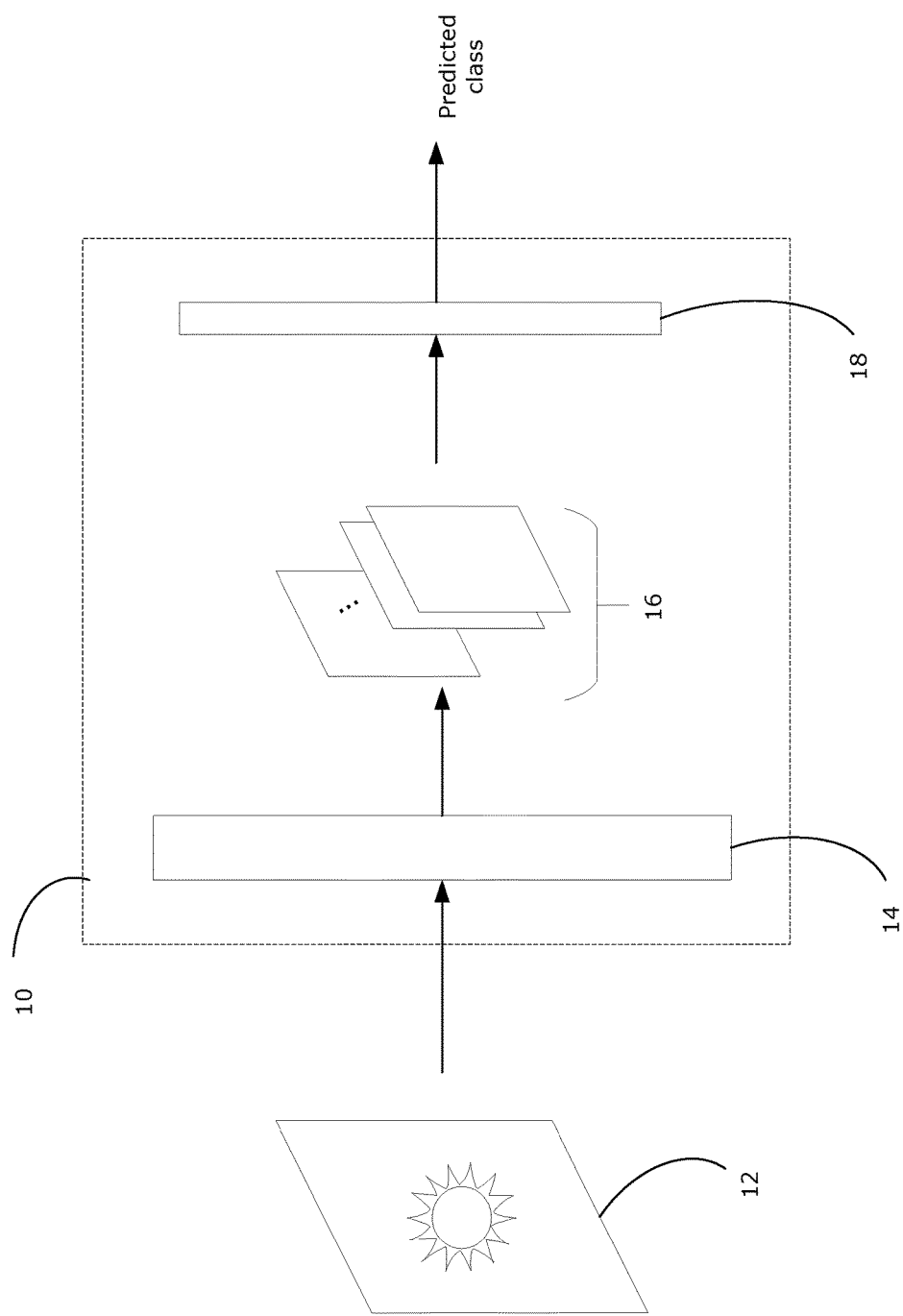
FIG. 1A is a block diagram of a simplified convolutional neural network, which may be used in examples of the present disclosure.

In various examples, the present disclosure describes methods and systems for optimally weighting search results retrieved using more than one vector-based search operator within a hybrid search framework. A dynamic weighting module receives a search query and applies dynamically optimized weights to a set of search results for generating more relevant search result sets within the hybrid search framework.

Examples of the disclosed dynamic weighting module may improve the performance of hybrid search engines by improving the quality and relevance of returned search results. By dynamically adjusting the weights for search results obtained using text and image embeddings, the system can leverage the unique advantages and semantic understanding capabilities of various types of embedding models, to capture different object features and deliver more relevant results. Improving the accuracy, quality and efficiency of returned search results may increase computing efficiency, for example, by reducing the number of search queries and subsequent results pages and reducing the use of computing resources (e.g., processing power, memory, computing time, etc.) needed for arriving at a desired search result.

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publically-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
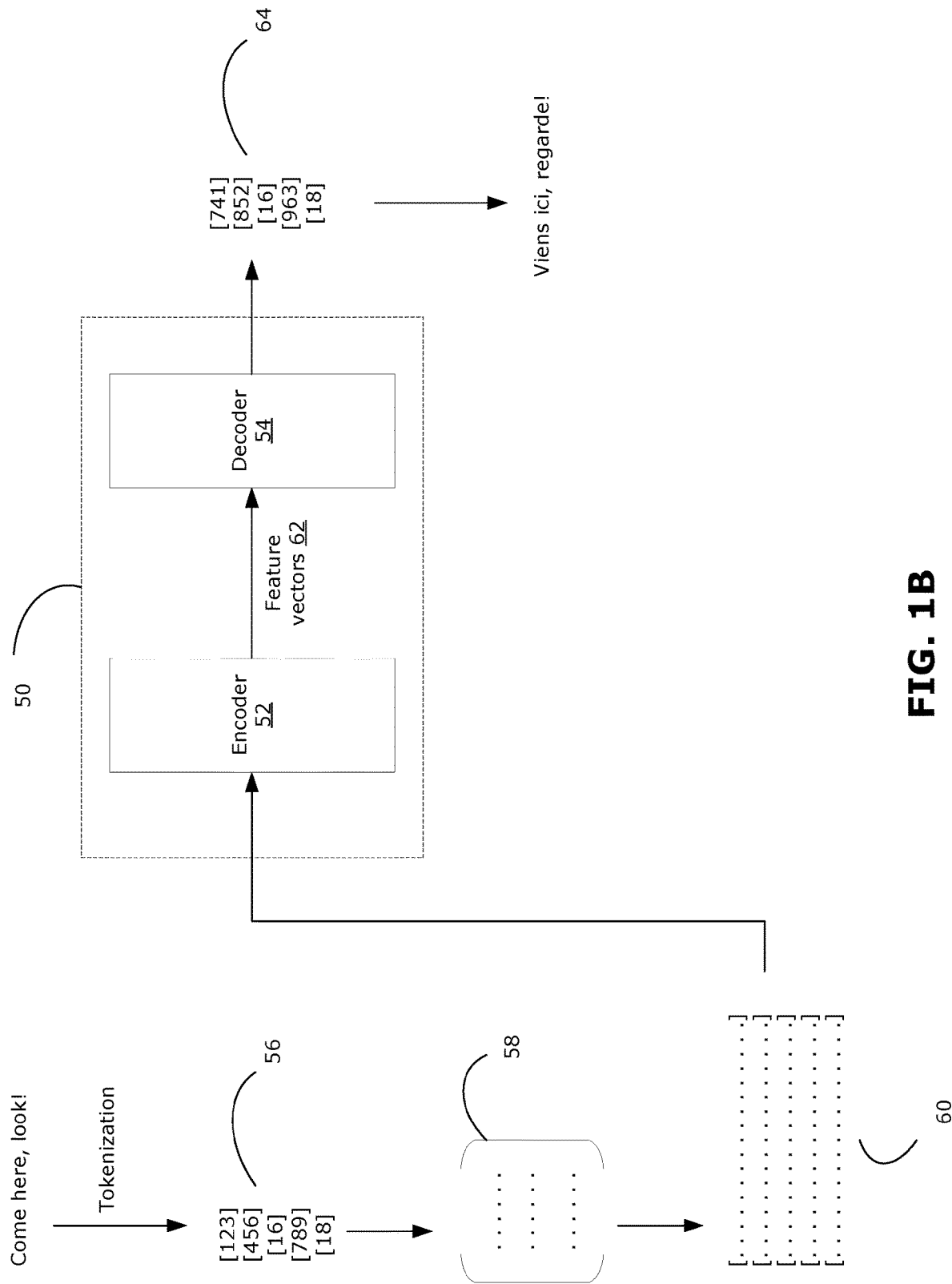
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labeled (e.g., annotated to indicate verbs, nouns, etc.) or unlabeled. LLMs may be trained on a large unlabeled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some preprocessing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space (or embedding space) may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Although described above in the context of language tokens, embeddings and feature vectors are also commonly used to encode information about objects and their relationships with each other. For example, embeddings and feature vectors are frequently used in computer vision applications for object detection and semantic understanding. Embeddings that represent objects may be found in an embedding space, where the similarity and relationship of two objects (e.g., similarity between a cat and a lion) may be represented by the distance between the two corresponding embeddings in the embedding space.

Figure 2:
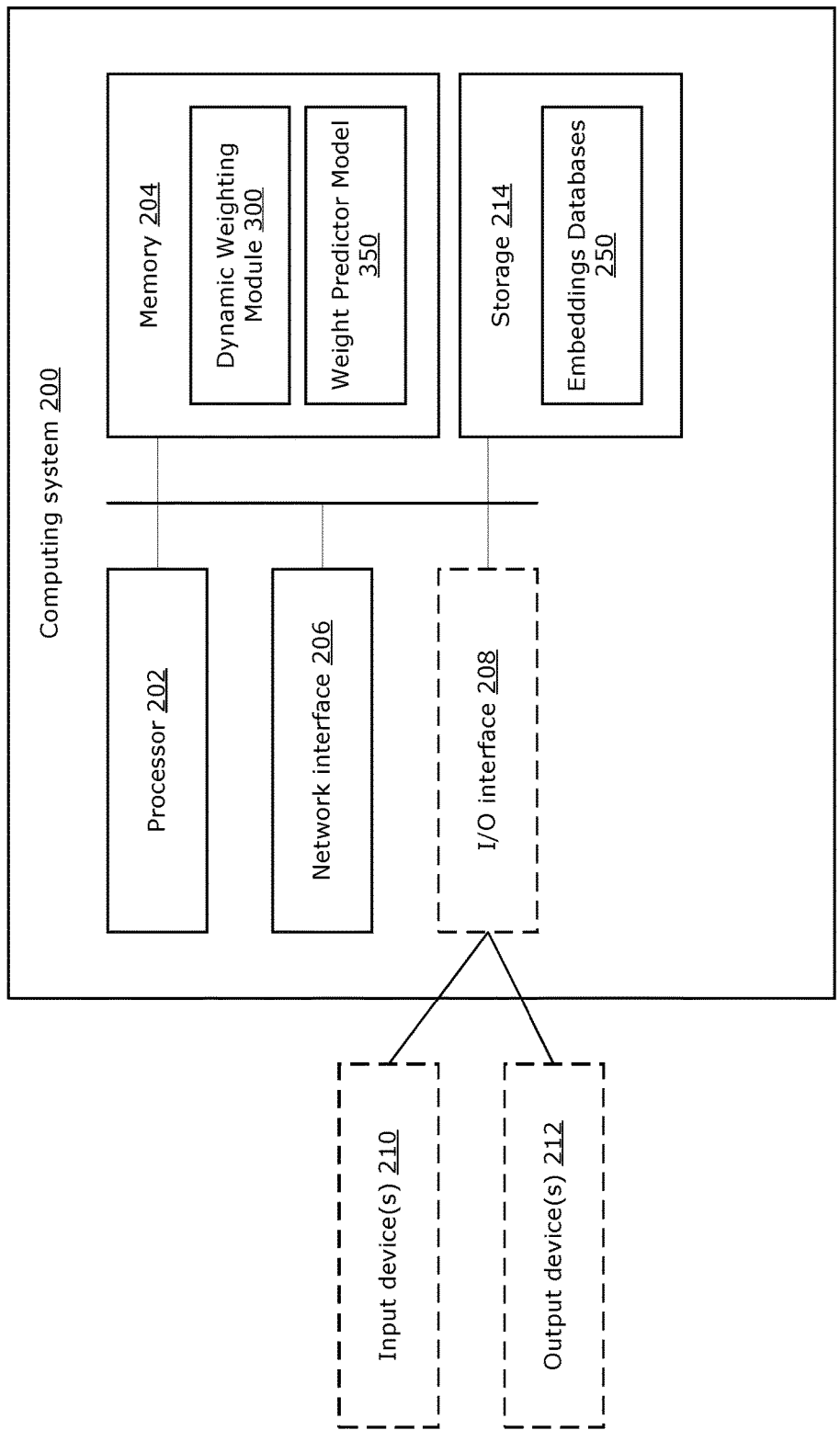
FIG. 2 is a block diagram of an example computing system, which may be used to implement examples of the present disclosure.

FIG. 2 illustrates an example computing system 200, which may be used to implement examples of the present disclosure. For example, the computing system 200 may be used to generate a combined search result set based on a user input. Additionally or alternatively, the computing system 200 may be used to train a weight predictor model 350, for generating a set of optimal weights used to generate the combined search result set, as disclosed herein.

The example computing system 200 includes at least one processing unit and at least one physical memory 204. The processing unit may be a hardware processor 202 (simply referred to as processor 202). The processor 202 may be, for example, a central processing unit (CPU), a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 204 may include a volatile or non-volatile memory (e.g., a flash memory, a random access memory (RAM), and/or a read-only memory (ROM)). The memory 204 may store instructions for execution by the processor 202, to the computing system 200 to carry out examples of the methods, functionalities, systems and modules disclosed herein.

The computing system 200 may also include at least one network interface 206 for wired and/or wireless communications with an external system and/or network (e.g., an intranet, the Internet, a P2P network, a WAN and/or a LAN). A network interface may enable the computing system 200 to carry out communications (e.g., wireless communications) with systems external to the computing system 200, such as a LLM residing on a remote system or remote embeddings databases.

The computing system 200 may optionally include at least one input/output (I/O) interface 208, which may interface with optional input device(s) 210 and/or optional output device(s) 212. Input device(s) 210 may include, for example, buttons, a microphone, a touchscreen, a keyboard, etc. Output device(s) 212 may include, for example, a display, a speaker, etc. In this example, optional input device(s) 210 and optional output device(s) 212 are shown external to the computing system 200. In other examples, one or more of the input device(s) 210 and/or output device(s) 212 may be an internal component of the computing system 200.

In the example of FIG. 2, the computing system 200 may store in the memory 204 computer-executable instructions, which may be executed by a processing unit such as the processor 202, to implement one or more embodiments disclosed herein. For example, the memory 204 may store instructions for implementing a dynamic weighting module 300, described with respect to FIG. 3A and FIG. 3B below. Optionally, the memory 204 may also store instructions for implementing a trained weight predictor model 350, described with respect to FIG. 3A and FIG. 3B below. In some examples, the computing system 200 may be a server of an online platform that provides the dynamic weighting module 300 as a web-based or cloud-based service that may be accessible by a user device (e.g., via communications over a wireless network). Other such variations may be possible without departing from the subject matter of the present application.

The computing system 200 may also include a storage unit 214, which may include a mass storage unit such as a solid state drive, a hard disk drive, a magnetic disk drive and/or an optical disk drive. The storage unit 214 may store data, for example, embeddings databases 250, among other data. In some examples, the storage unit 214 may serve as a database accessible by other components of the computing system 200. In some examples, the embeddings databases 250 may be external to the computing system 200, for example the computing system 200 may communicate with an external system to access the embeddings databases 250.

As will be discussed further below, the present disclosure describes an example dynamic weighting module, for example, for use in a hybrid search engine, that provides dynamic weighting of search results corresponding to more than one embedding model.

Figure 3A:
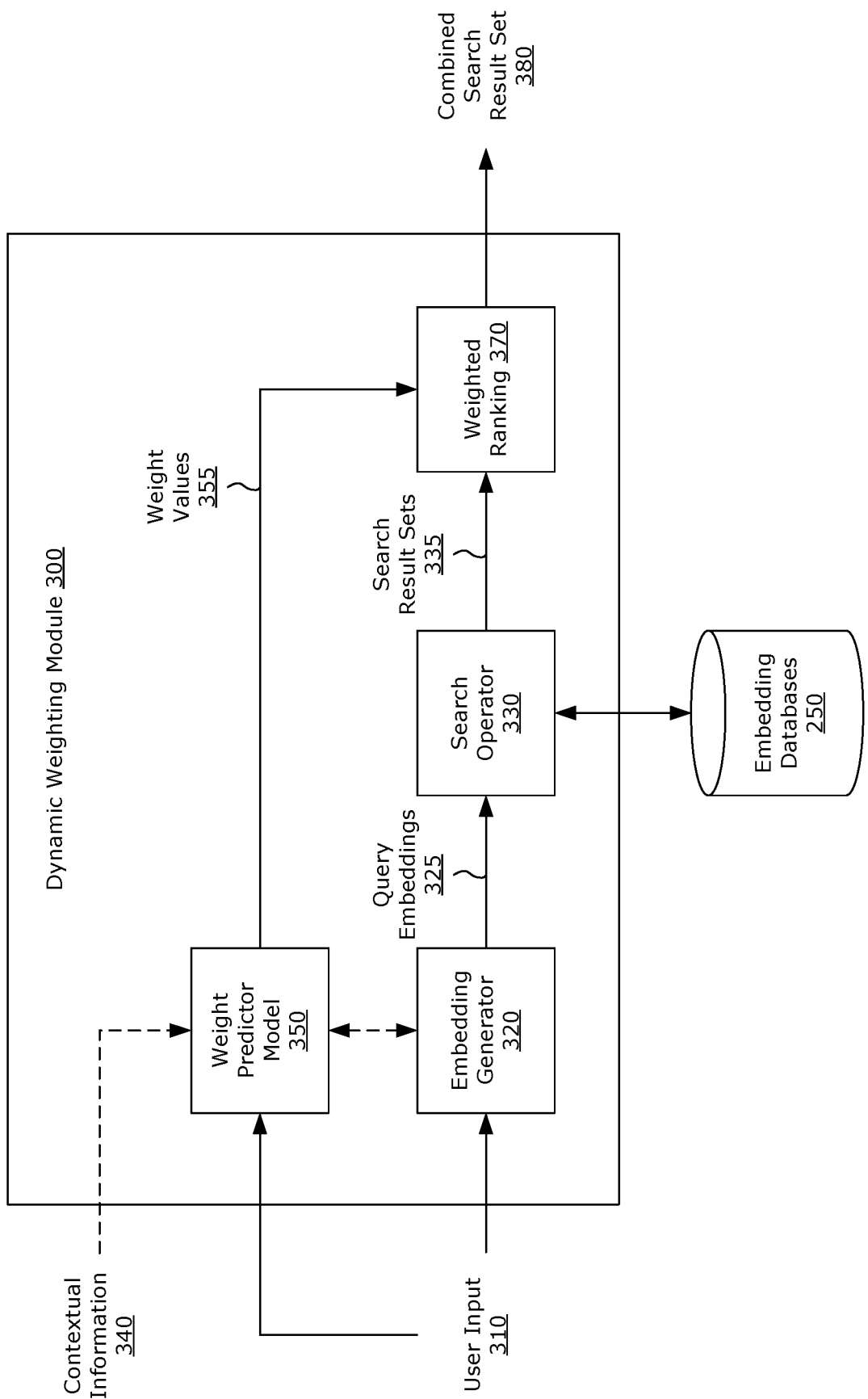
FIG. 3A is a simplified block diagram of an example architecture for the dynamic weighting module, in accordance with examples of the present disclosure.

FIG. 3A shows a simplified block diagram of an example architecture for the dynamic weighting module 300, in accordance with examples of the present disclosure. The dynamic weighting module 300 may be a software that is implemented in the computing system 200 of FIG. 2, in which the processor 202 is configured to execute instructions of the dynamic weighting module 300 stored in the memory 204. The dynamic weighting module 300 includes two or more embedding generators 320 and corresponding search operators 330, a weight predictor model 350 and a weighted ranking block 370. It should be understood that the blocks 320, 330, 350 and 370 are exemplary and not intended to be limiting. For example, the dynamic weighting module 300 may include a greater or fewer number of modules than that shown. As well, operations described as being performed by a particular module may be additionally or alternatively performed by another subsystem. For example, operations of the embedding generator 320 may be part of the operations of the search operator 330. The dynamic weighting module 300 may receive a user input 310 and generate a combined search result set 380, for causing a display of the user device to provide output based on the combined search result set 380.

In examples, the user input 310 may be received by the dynamic weighting module 300, for example, as a search query received from a user device. In examples, the dynamic weighting module 300 may be associated with a hybrid search engine, among other applications and the user input 310 may be received as a search query in a hybrid search engine user interface (UI). In examples, the user input 310 may be received as a textual input, for example, received via a textbox object in the search engine UI, among others. In other examples, the user input 310 may be an audio input, for example, received via a microphone of computing system 200, or the user input 310 may be received in another format, for example, as a touch input, or the user input 310 may be received as a selection of an item (e.g., a topic or category, or another object) on a webpage of an e-commerce platform, among other inputs.

In examples, the embedding generator 320 may receive the user input 310 and may generate a query embedding 325. In the present disclosure, "embeddings" can refer to learned representations of discrete variables as vectors of numeric values, where the "dimension" of the embedding corresponds to the length of the vector (i.e., each entry in the embedding is a numeric value in a respective dimension represented by the embedding). In some examples, embeddings may be referred to as embedding vectors. In examples, embeddings may represent a mapping between discrete variables and a vector of continuous numbers that effectively capture meaning and/or relationships in the data. In examples, embeddings may be represented as points in a multidimensional space (which may be referred to as the embedding space), where embeddings exhibiting similarity are clustered closer together. In examples, embeddings may be learned for neural network models.

In examples, the embedding generator 320 may represent an embedding model and may apply an embedding transformation to the user input 310, to generate the query embedding 325. In some embodiments, for example, the embedding generator 320 may be an encoder, and the embedding generator 320 may encode the user input 310 using an embedding model (e.g., a text embedding model, an image embedding model, etc.), for example, to generate the query embedding 325. In examples, the embedding generator 320 may transform the user input 310 into a respective embedding vector within an embedding space. In examples, the embedding generator 320 may apply the transformation using a neural network model. In other implementations, the embedding generator 320 may represent a lookup table, for example, that maps the user input to embeddings that have previously been generated by an embedding model, among other possibilities.

In examples, two or more embedding generators 320 may encode the user input 310 into corresponding query embeddings 325, for example, where each of the two or more query embeddings 325 may be usable by a respective different search operator 330. In examples, a search operator 330 may also be referred to as search model, search algorithm etc. For exemplary purposes, implementations of the present disclosure may be described in the context of using two embedding generators (e.g., a textual embedding generator and a multimodal embedding generator), however more than two embedding generators 320 may be used. It should be understood that this is only exemplary and is not intended to be limiting.

Figure 3B:
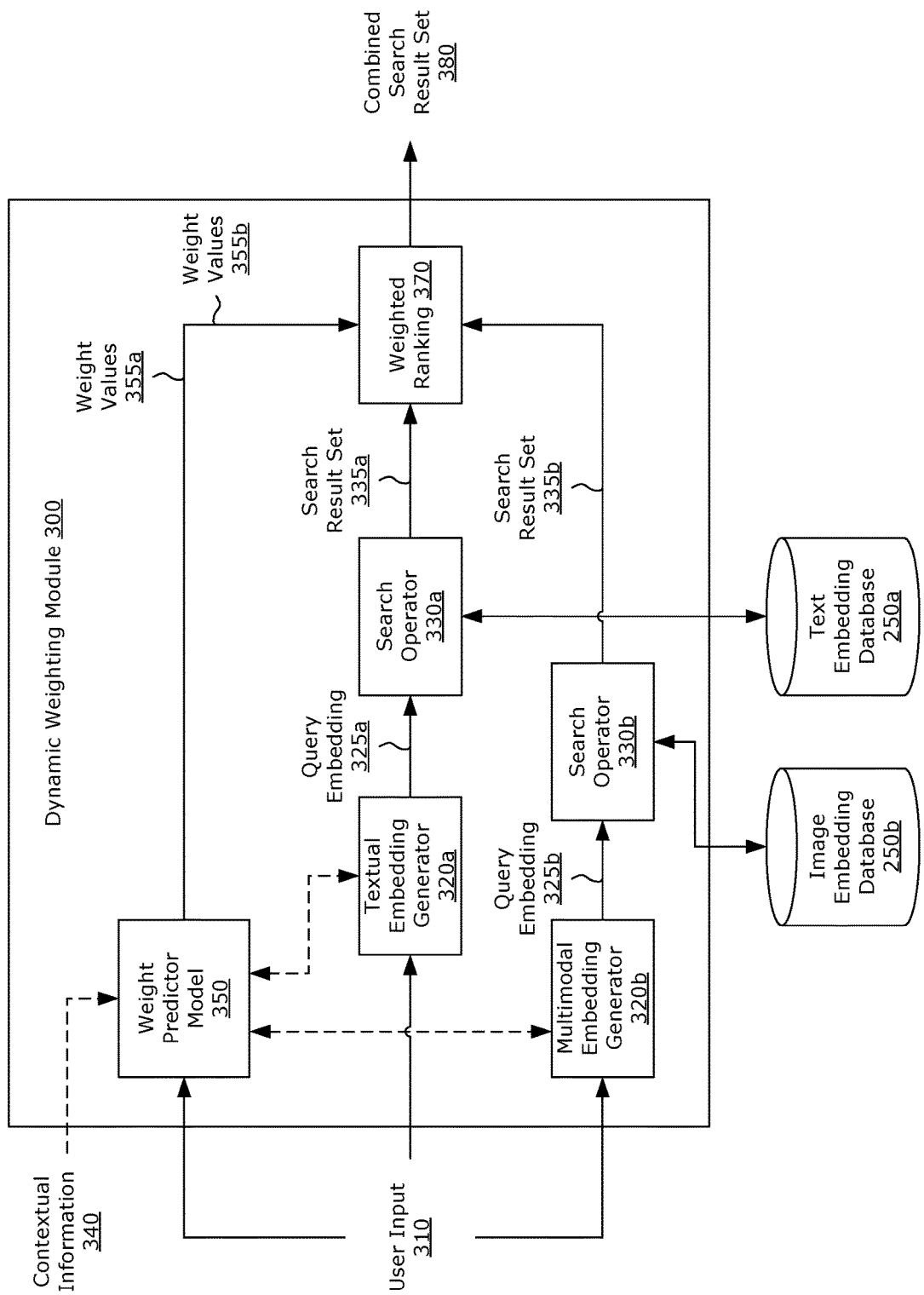
FIG. 3B is a simplified block diagram of an example architecture for the dynamic weighting module including two embedding generators, in accordance with examples of the present disclosure.

FIG. 3B shows a block diagram of an example architecture for the dynamic weighting module 300 including two embedding generators, in accordance with examples of the present disclosure. The dynamic weighting module 300 may be a software that is implemented in the computing system 200 of FIG. 2, in which the processor 202 is configured to execute instructions of the dynamic weighting module 300 stored in the memory 204. In the example of FIG. 3B, the dynamic weighting module 300 includes two embedding generators 320a, 320b and corresponding search operators 330a, 330b, a weight predictor model 350 and a weighted ranking block 370.

In examples, one of the two or more embedding generators 320 may be a textual embedding generator 320a, for example, for enabling the comparison of a search query text with a database of text embeddings 250a (e.g., product text embeddings in an e-commerce platform, among other text embeddings). In examples, the textual embedding generator 320a may include the E5 text embedding model (e.g., EmbEddings from bidirectional Encoder rEpresentations) which is a natural language processing model for encoding the user input 310, or another textual embedding model may be used. In examples, another one of the two or more embedding generators 320 may be a multimodal embedding generator 320b, for example, for enabling the comparison of search query text with a database of image embeddings 250b (e.g., product images in an e-commerce platform, among other image embeddings). In some examples, a multimodal embedding generator 320b may include a multimodal embedding model that has been trained to encode an input having more than one modality (e.g., a combination of text, image, video etc.) into a shared embedding space. In examples, the multimodal embedding generator 320b may include the contrastive language-image pre-training (CLIP) model for encoding the user input 310, or another embedding model may be used. In some examples, an image embedding generator may be used for enabling the comparison of a search query text with a database of image embeddings 250b or the multimodal embedding generator 320b may include an image embedding model for enabling the comparison of a search query text with a database of image embeddings 250b, for example, by encoding text and images into a shared embedding space. In this regard, the technical solution benefits from the advantages of different embedding models in capturing different object features and returning more relevant results.

In examples, the textual embedding generator 320a and the multimodal embedding generator 320b may encode the user input 310 into query embeddings 325a and 325b, respectively. In examples, the query embeddings 325a and 325b may be provided to search operators 330 corresponding to the embedding generators 320 to obtain corresponding search result sets 335. In examples, the search operators 330 may be configured to interface with databases of stored embeddings (e.g., embeddings databases 250) such as databases of stored textual embeddings (e.g., text embedding database 250a) and/or stored image embeddings (e.g., image embedding database 250b), for retrieving the relevant search result sets 335. For example, a query embedding 325a generated using a textual embedding generator 320a may be provided to a corresponding search operator 330a configured to obtain search results from an embedding space encoded by the same textual embedding generator 320a, while a query embedding 325b generated using a multimodal embedding generator 320b may be provided to a corresponding search operator 330b configured to obtain search results based on searching an embedding space encoded by the same multimodal embedding generator 320b. In this regard, search operators 330 may query embeddings databases 250 to obtain search result sets 335 having search results and associated scores, where the associated scores may be similarity scores.

With reference to FIG. 3A, search operators 330 may obtain search result sets 335, based on measures of similarity between sets of candidate embeddings of an embedding space and a corresponding query embedding 325. In examples, a search operator 330 may perform a vector similarity search operation within an embedding space to identify the set of candidate embeddings. In examples, a nearest neighbor approach may be used to identify the set of candidate embeddings, where the similarity measure may be a distance measure, such as a Euclidean distance measured between the query embedding 325 and the candidate embeddings in any direction within the embedding space, or the similarity measure may be a cosine similarity (e.g., a cosine of the angle between the query embedding 325 and the candidate embeddings), among other possibilities. In examples, sets of candidate embeddings identified during the vector similarity search operation may be transformed into corresponding search result sets 335, (for example, based on a mapping between candidate embeddings and corresponding search results) where each search result includes a similarity score (e.g., determined during the vector similarity search operation for its corresponding embedding), representing a relevance to the search query.

With reference to FIG. 3B, where an example implementation of the dynamic weighting module 300 includes a text embedding generator 320a and a multimodal embedding generator 320b, the sets of candidate embeddings retrieved by search operator 330a may represent candidate text embeddings (such as product descriptions or metadata extracted from product pages in an e-commerce platform, among other textual content) while the sets of candidate embeddings retrieved by search operator 330b may represent candidate image embeddings (such as associated with product images in an e-commerce platform, or other image content). For example, a first set of candidate embeddings corresponding to textual embedding generator 320a may be obtained based on corresponding similarity scores, for example, as a pre-determined number of candidate text embeddings or as a number of candidate text embeddings having a similarity score above a threshold value, among other possibilities. In examples, a second set of candidate embeddings corresponding to a multimodal embedding generator 320b may be obtained based on corresponding similarity scores, for example, as a pre-determined number of candidate image embeddings or as a number of candidate image embeddings having a similarity score above a threshold value, among other possibilities. In examples, the first set of candidate embeddings may be transformed into corresponding search result set 335a and the second set of candidate embeddings may be transformed into corresponding search result set 335b, for example, based on a mapping between candidate embeddings and corresponding search results, where each search result in the search result sets 335a and 335b include a similarity score representing a relevance to the search query.

Responsive to receiving the user input 310 (e.g., search query), the weight predictor model 350 may dynamically predict a set of optimal weight values 355 (e.g., at query time) corresponding to a set of specific embedding generators 320. For example, the weight predictor model 350 may predict a first weight value 355a corresponding to the textual embedding generator 320a and a second weight value 355b corresponding to the multimodal embedding generator 320b, based on the user query. In some implementations, for example, the weight predictor model 350 may receive the user input 310 as an input to the model, or the weight predictor model 350 may receive embeddings of the user input 310 (e.g., query embeddings 325, or other embeddings of the user input 310) as input to the model, among other possibilities.

In examples, the weight predictor model 350 may be a trained machine learning model. In examples, the weight predictor model 350 may be trained using a uniquely generated training dataset (described with respect to FIG. 5 below) for learning to dynamically predict optimal weight values 355 for search results returned corresponding to different types of embeddings (e.g., text embeddings, image embeddings, etc.), for example, based on the nature of the search query at query time. In this regard, the weight predictor model 350 may learn that for some search queries, a higher weight assigned to search results obtained using a text embedding generator 320a (e.g., a text embedding model such as E5) may enable the hybrid search engine to return more relevant search results, while in other cases, a search query may benefit from a higher weight being assigned to search results obtained using a multimodal embedding generator 320b (e.g., an image embedding model such as CLIP). For example, a search query including a part number or a specification (e.g., #8 machine screw 2") may cause the weight predictor model 350 to predict a higher weight value 355 corresponding to search results obtained using a textual embedding generator 320a, because a text embedding model may encode more information contained in the textual metadata associated with an object, such as a product specification, that may not be as apparent from an image. Similarly, a search query including a style descriptor for an apparel item (e.g., red strappy sundress) may cause the weight predictor model 350 to predict a higher weight value 355 corresponding to search results obtained using a multimodal embedding generator 320b, because an image embedding model may encode more information contained in the image features (including colour and style) associated with an object, that may not be as apparent in textual metadata associated with the object.

In some examples, the weight predictor model 350 may also be trained to predict a set of optimal weight values 355 based on a category associated with a search query, or based on another filter that may be applied within a search engine UI to narrow a search query based on attributes, for example, brand, sku, colour, size, style etc. For example, when a search is being performed within a product category such as "apparel", the predicted weight values 355 may be generated for enabling a greater emphasis on search results returned corresponding to a multimodal embedding generator. In other examples, the weight predictor model 350 may be trained to predict a set of optimal weight values 355 based on an embedding of a category, or an embedding of the filter, among other possibilities.

The weight predictor model 350 may also be trained to predict a set of optimal weight values 355 based on other inputs (e.g., user demographics, user search history, metadata etc.). In some implementations, for example, the weight predictor model 350 may optionally receive contextual information 340 or metadata related to a user search session (e.g., a sequence of queries or products viewed, browsing activity etc.) or related to a user account or profile (e.g., buyer embeddings). For example, contextual information 340 may include information about a user profile, demographics, country, language, recent viewing or search history, for example, recent webpages visited, recent documents viewed, previous search queries or previous user inputs 310, among other information. For example, the user's recent viewing or search history may be obtained from a browser application, or from data stored in a user profile associated with the user, among other possibilities. In other examples, the weight predictor model 350 may optionally receive contextual information 340 about a user's account, for example, related to an e-commerce platform. In examples, the contextual information 340 may include information such as a membership or subscription status or a membership-tier, for example, whether the user is a merchant or a customer, among other information. In examples, the weight predictor model 350 may be trained to predict optimal weight values 355 based on optional contextual information 340. In other examples, the weight predictor model 350 may be trained to predict a set of optimal weight values 355 based on an embedding of the contextual information 340, among other possibilities.

In some examples, depending on the search query, the weight predictor model 350 may return a weighting value 355 of zero for search results obtained using a specific type of embedding generator. In this regard, the weight predictor model 350 may communicate with the embedding generators 320 prior to the generation of the query embeddings 325, for example, to inform a certain one embedding generator 320 that it does not have to generate query embeddings 325. In this regard, the dynamic weighting module 300 may improve computational efficiency by avoiding the unnecessary computation of query embeddings 325.

In examples, a weighted ranking block 370 may receive the search result sets 335 and the optimal weight values 355 and may combine the search result sets 335 using a weighted ranking approach, to yield a combined search result set 380. As shown in FIG. 3B, text embedding similarity scores associated with search results in a first search results set 335a (e.g., which are obtained from the search operator 330a corresponding to the textual embedding generator 320a), may be multiplied by a first weight value 355a corresponding to the textual embedding generator 320a, to generate corresponding weighted text embedding similarity scores. Similarly, image embedding similarity scores associated with search results in a second search results set 335b (e.g., which are obtained from the search operator 330b corresponding to the multimodal embedding generator 320b), may be multiplied by a second weight value 355b corresponding to the multimodal embedding generator 320b, to generate corresponding weighted image embedding similarity scores. In examples, the first search result set 335a and the second search result set 335b may be pooled and ordered according to magnitudes of the weighted text embedding similarity scores and magnitudes of the weighted image embedding similarity scores, for example, from largest to smallest, where larger magnitudes may be associated with a search result that is more relevant to the search query. In some implementations, for example, a search result in the first set of search results 335a and a search result in the second set of search results 335b may represent the same object, for example, the same webpage, item, product, etc. In examples, for search results represented in both the first set of search results 335a and the second set of search results 335b, corresponding weighted text-image embedding similarity scores may be generated by adding corresponding weighted text embedding similarity scores present in the first set of search results 335a with corresponding weighted image embedding similarity scores present in the second set of search results 335b. In this regard, search results that are represented in more than one set of search results 335, may be ordered according to magnitudes of the weighted text-image embedding similarity scores, instead of according to magnitudes of the weighted text embedding similarity scores or magnitudes of the weighted image embedding similarity scores.

In some implementations, for example, the search result sets 335 may also be ordered, for example, taking into account contextual information 340. For example, contextual information or metadata related to a user search session (e.g., a sequence of queries or products viewed, browsing activity, recent viewing or search history etc.) or related to a user account or profile may be received by the weighted ranking block 370, for ordering and/or ranking the search result sets 335 based on this information.

With reference to FIG. 3A, in response to pooling and ordering the search results in the search result sets 335 (e.g., based on magnitudes of weighted similarity scores, or optionally, based on contextual information 340), the weighted ranking block 370 may apply a ranking to each of the search results based on the ordering, for example, where search results associated with higher weighted similarity scores receive a higher ranking, and lower weighted similarity scores receive a lower ranking. In some implementations, the combined search result set 380 may represent a pre-determined number of the highest ranked search results in the search result sets 335 (e.g., the 50 highest ranked candidate embeddings, or the 500 highest ranked candidate embeddings, etc.), or in other implementations, the combined search result set 380 may represent a subset of the ranked search results in the search result sets 335 having a magnitude of a weighted similarity score above a pre-determined threshold, among other possibilities, with effect that the combined search result set 380 represents a more relevant search result set.

In examples, the combined search result set 380 may be provided for display via a user device. For example, the dynamic weighting module 300 may be configured to cooperate with a search engine or a UI of a search engine for displaying the combined search result set 380 on a display of a user device. In some implementations, for example, the dynamic weighting module 300 may be associated with a hybrid search engine and the combined search result set 380 may be input to the hybrid search engine as an embeddings-based search component and combined with a lexical-based search component, for displaying a hybrid search result set on a display of a user device. In some implementations, for example, the hybrid search engine may be associated with an e-commerce platform, and the hybrid search result set may be displayed on a webpage of the e-commerce platform.

In some implementations, a user may interact with a displayed combined search result set 380, or more particularly, with one or more of the displayed search results in the combined search result set 380, for example, in a search engine UI. For example, an interaction may include the application of a filter within the search engine UI, or another interaction for narrowing the displayed search results. In other examples, an interaction within the context of an e-commerce platform may include clicking on, purchasing, adding to a cart, sharing, reviewing, adding to a wishlist etc. or otherwise engaging with the displayed search result of the displayed combined search result set 380. In other implementations, an interaction within the context of general search engine may include clicking on, viewing for a pre-determined period of time (e.g., bounce rate), bookmarking, sharing, printing etc. or otherwise engaging with the displayed search result of the displayed combined search result set 380.

In examples, an interaction with a displayed search result of the displayed combined search result set 380 may refine the combined search result set 380 by causing the weight predictor model 350 to generate a new set of weights which can be applied to the already obtained search results (e.g., search result sets 335), without re-running the search operators. A traditional filter of a result set may simply exclude results that do not match the filter, while the remaining search results are maintained in the same order. In contrast, by dynamically updating the weights according to the filter, the order of the search results may also be refined, so that more relevant search results are ranked higher in the list. In this regard, refining the initial search results by re-ranking or re-ordering may improve the computing efficiency of the search engine, by using simple arithmetic and sorting operations, and avoiding the re-computation of embedding vectors in order to re-order the results.

In examples, an interaction with a displayed search result may represent a search modifier associated with the search query. In examples, in response to receiving a search modifier associated with the search query, from the user device, the dynamic weighting module 300 may instruct the weight predictor model 350 to update the optimal weight values 355, based on the search modifier. In examples, contextual information 340 or metadata or based on other information such as the selection of a category or a filter, etc. associated with the search modifier may be provided, together with the search query, as input to the weight predictor model 350, to cause the weight predictor model 350 to predict updated optimal weight values. In examples, the weighted ranking block 370 may receive the updated optimal weight values and may apply the updated optimal weight values to the previously obtained first set of search results (e.g., search result sets 335) to generate an updated combined search result set, for example, by re-ordering and/or re-ranking the search result sets 335 according to the updated optimal weight values. In this regard, the combined search result set 380 may be modified, based on the first combined search result set 380 and the set of updated optimal weight values.

Figure 4:
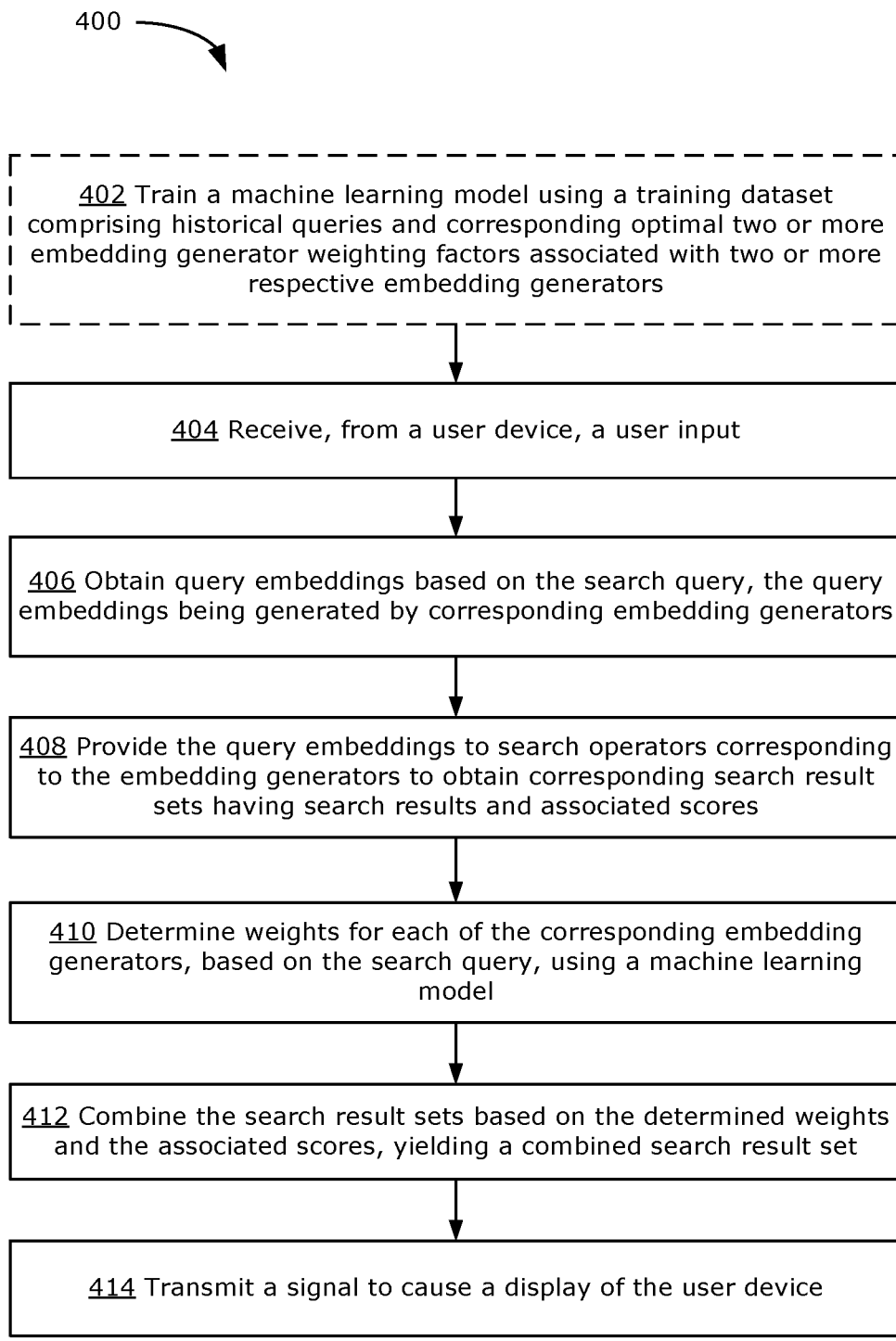
FIG. 4 is a flowchart of an example method for dynamically applying a set of predicted weights to a set of search results, in accordance with examples of the present disclosure.

FIG. 4 is a flowchart of an example method 400 for dynamically applying a set of predicted weights to a set of search results, in accordance with examples of the present disclosure. The method 400 may be performed by the computing system 200. For example, a processing unit of a computing system (e.g., the processor 202 of the computing system 200 of FIG. 2) may execute instructions (e.g., instructions of the dynamic weighting module 300) to cause the computing system to carry out the example method 400. The method 400 may, for example, be implemented by an online platform or a server.

Optionally, at an operation 402, a machine learning model may be trained using a training dataset comprising historical queries and corresponding optimal two or more embedding generator weighting factors associated with two or more respective embedding generators 320. In examples, the trained machine learning model may be the weight predictor model 350 that has been trained to using a uniquely generated training dataset (described with respect to FIG. 5) to predict optimal weight values 355 for different types of embeddings (e.g., text embeddings, image embeddings, etc.) based on the nature of the search query. For example, the training data may take the form of (query, weight_embedding_1, weight_embedding_2, . . . weight_embedding_n), representing, for a given unique query, optimal weights associated with n separate embedding generators 320.

At an operation 404, a user input 310 may be received by the dynamic weighting module 300 from a user device, for example, as a search query. In examples, the user input 310 may be received as a textual input, an audio input, a touch input, as a selection of an item on a webpage of an e-commerce platform, among other inputs.

At an operation 406, query embeddings 325 may be obtained, based on the search query. In examples, the query embeddings 325 may be generated by corresponding embedding generators 320 (e.g., textual embedding generator 320a or multimodal embedding generator 320b, among others), for transforming a search query (e.g., user input 310) into a corresponding query embedding 325. In some implementations, the embedding generator may represent a lookup table, for example, that stores embeddings that have previously been generated by an embedding model, among other possibilities.

At an operation 408, the query embeddings 325 may be provided to search operators 330 corresponding to the embedding generators 320 to obtain corresponding search result sets 335 having search results and associated scores. In this regard, each embedding generator 320 (e.g., embedding generators 320a and 320b) may generate a query embedding 325 that may be usable by a respective different search operator 330 (e.g., search operators 330a and 330b). In examples, the search operators 330 are configured to interface with databases of stored embeddings (e.g., embeddings databases 250) for retrieving the relevant search result sets 335. For example, an embedding generator 320 may represent textual embedding generator 320a, and a corresponding search operator 330a may enable the comparison of a search query text with a database of text embeddings 250a during search result retrieval, or an embedding generator 320 may represent a multimodal embedding generator 320b, and a corresponding search operator 330b may enable the comparison of a search query text with a database of image embeddings 250b during search result retrieval. In this regard, search operators 330 may query embeddings databases 250 to obtain search result sets 335 having search results and associated scores, where the associated scores may be similarity scores.

At an operation 410, weights for each of the corresponding embedding generators may be determined, based on the search query, using the machine learning model. Although operation 410 is shown as following operation 408, it is understood that operation 410 may be performed at any time after operation 404 (e.g., after the user input 310 is received), or may be performed concurrently with operation 404, for example, optimal weights for each of the corresponding embedding generators may be determined dynamically at query time, for example, as the user input 310 is received.

At an operation 412, the search result sets 335 may be combined based on the determined weights 355 and the associated scores, yielding a combined search result set 380. In examples, sets of candidate embeddings identified during the vector similarity search operation may be transformed to corresponding search result sets 335, (for example, based on a mapping between candidate embeddings and corresponding search results), where each search result includes a similarity score (e.g., determined during the vector similarity search operation for its corresponding embedding), representing a relevance to the search query. In examples, the similarity scores may be multiplied by corresponding weight values 355 to generate weighted similarity scores, and the search result sets 335 may be ordered and/or ranked according to weighted similarity scores, to yield the combined search result set 380.

At an operation 414, a signal may be transmitted to cause a display of the user device to provide output based on the combined search result set. For example, the dynamic weighting module 300 may be configured to cooperate with a search engine or a UI of a search engine for displaying the combined search result set 380 on a display of a user device.

Figure 5:
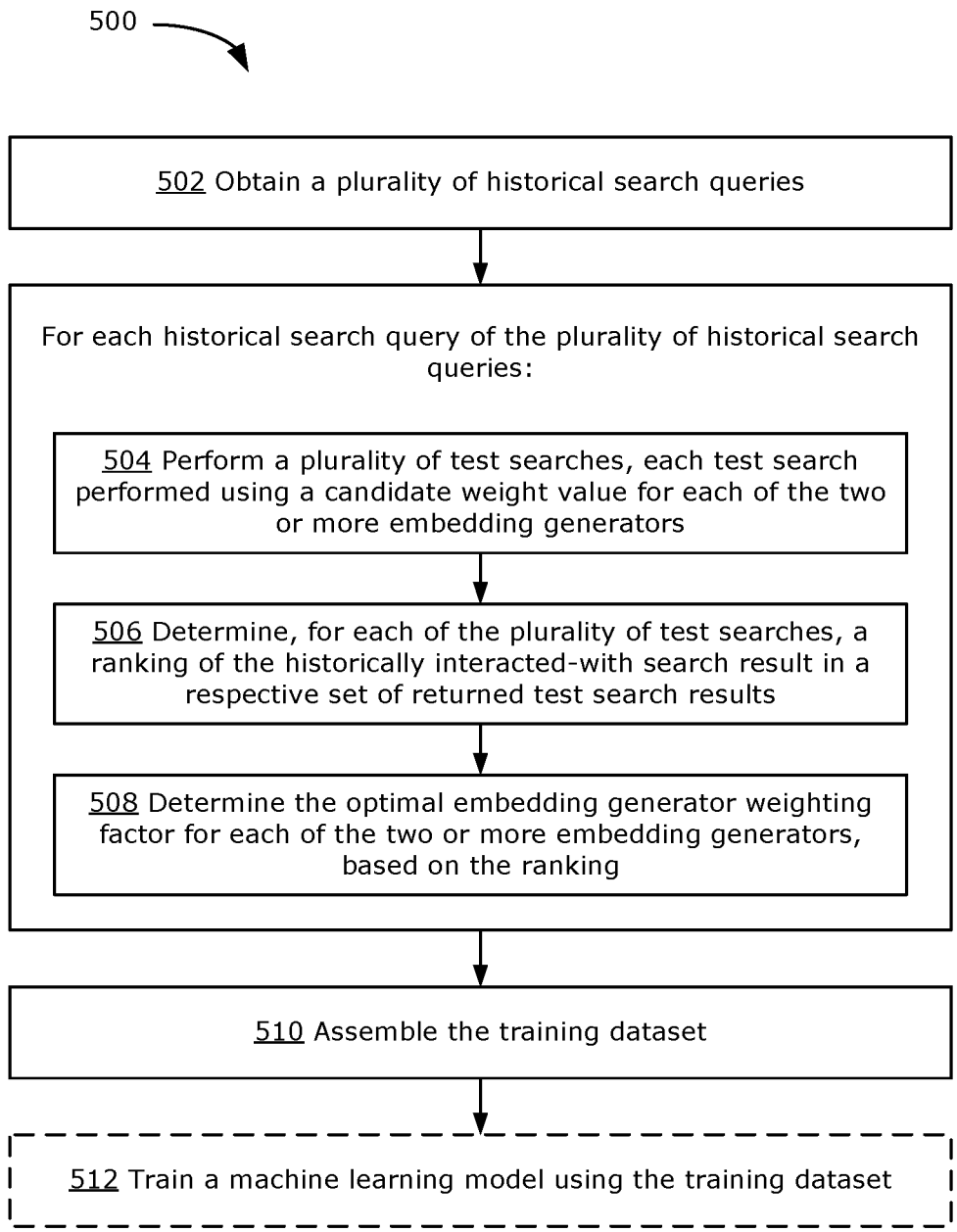
FIG. 5 is a flowchart of an example method 500 for generating a training dataset for training the weight predictor model 350, in accordance with examples of the present disclosure.

FIG. 5 is a flowchart of an example method 500 for generating a training dataset for training the weight predictor model 350, in accordance with examples of the present disclosure. The method 500 may be performed by the computing system 200. For example, a processing unit of a computing system (e.g., the processor 202 of the computing system 200 of FIG. 2) may execute instructions (e.g., instructions of the dynamic weighting module 300) to cause the computing system to carry out the example method 500. The method 500 may, for example, be implemented by an online platform or a server.

At an operation 502, a plurality of historical search queries may be obtained, each of the historical search queries being associated with at least one historically interacted-with search result. For example, training data for training the weight predictor model 350 may be generated based on historical search data. In examples, the historical search data may include a plurality of queries (e.g., search queries inputted by different users over a historical time period) and a list of the search results which are associated with high levels of user interaction for each query, where interaction can mean a user clicked on, purchased, added to a cart, shared, reviewed, added to a wishlist, viewed for a pre-determined period of time, bookmarked, printed, etc. or otherwise engaged with the historical search result. In examples, the historical search data may also include historical contextual information for search sessions, including sequences of search queries or engagements over a period of time. In examples, it may be preferable for the training data to have a good distribution of queries, spanning a variety of categories. In other examples, it may not be necessary for the training data to have a good distribution of queries in examples where the search is expected to be within a narrow field (e.g., the search is only expected to be performed in the context of a particular website). It is important to note that one historical query may be associated with multiple objects (e.g., products, webpages) and/or may be associated with more than one category.

For each historical search query of the plurality of historical search queries, the following operations 504-508 may be performed. At an operation 504, a plurality of test searches may be performed. In examples, to perform the test searches, each historical query may first be transformed into two or more historical query embeddings using two or more embedding generators 320 and provided to respective search operators 330 to obtain test search result sets having search results and associated scores. In examples, candidate weight values may be applied to the test search result sets, for example, by multiplying the associated search result scores by corresponding candidate weight values to generate weighted scores (where the candidate weight values may correspond to each of the two or more embedding generators 320). For example, for each test search, different candidate weight values or combinations of candidate weight values may be applied to the test search result sets to so that the test search results reflect the impact of the candidate weight values on search rankings. In examples, the test search result sets may then be pooled and ordered and/or ranked according to the weighted scores.

At an operation 506, for each of the plurality of test searches, a ranking of the at least one historically interacted-with search result may be determined in a respective set of returned test search results. In examples, the success of candidate weight values may be indicated by the placement of the historically interacted-with search results in the returned test search results, with higher performing candidate weights returning the at least one historically interacted-with search results ranking higher in the returned set of test search results.

At an operation 508, the optimal embedding generator weighting factor for each of the two or more embedding generators may be determined, based on the ranking. For example, the candidate weight combination that returns a list of search results having the most historically interacted-with items at the top of the results page is considered the optimal weight value for that historical query. For example, a first set of candidate weight values may return test search results in which the historically interacted-with search results are top-ranked and a second set of candidate weight values may return different test search results in which the historically interacted-with search results are bottom-ranked. In such an example, the first set of candidate weight values would be considered to be more successful than the second set of candidate weight values. Thus, the first set of candidate weight values would be determined to be the optical embedding generator weighting factors for the two or more embedding generators.

At an operation 510, the training dataset may be assembled, for example, using the form of (query, weight_embedding_1, weight_embedding_2, . . . weight_embedding_n), representing, for a given unique historical query, optimal weights associated with n separate embedding models.

Optionally, at an operation 512, the training dataset may be used to train a machine learning model as described with respect to operation 402 in FIG. 4.

Examples of the present disclosure may enable a hybrid search engine to return more relevant search results, by dynamically weighting search result sets that are retrieved using more than one vector-based search operator. A dynamic weighting module associated with a hybrid search engine as disclosed herein may be used in various implementations, such as on a website, a portal, a software application, etc. The disclosed solution may improve the performance of hybrid search engines, for example, by dynamically (e.g., at query time) optimizing weights applied to search result sets that are retrieved using more than one vector-based search operator within the hybrid search framework. The disclosed solution may improve user interactions with search engines (e.g., search performed on an e-commerce platform, on a website, etc.) by presenting improved a search experience to users in a manner that is more relevant and appealing to the user. In this regard, presenting optimized search results to specific users in a manner that is more relevant and appealing to the user may increase computing efficiency, for example, by reducing the number of search queries and subsequent results pages and reducing the use of computing resources (e.g., processing power, memory, computing time, etc.) needed for arriving at a desired search result.

Although the present disclosure describes methods and processes with operations (e.g., steps) in a certain order, one or more operations of the methods and processes may be omitted or altered as appropriate. One or more operations may take place in an order other than that in which they are described, as appropriate.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. Any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method comprising:
receiving, from a user device, a search query;
obtaining two or more query embeddings based on the search query, the two or more query embeddings being generated by corresponding two or more embedding generators;
generating, by two or more search operators, two or more corresponding search result sets having search results and associated scores, based on the two or more query embeddings, wherein each of the two or more search operators is associated with a respective one of the two or more embedding generators;
determining, using a machine learning model, weights for the two or more search result sets, based on the search query and the two or more embedding generators;
combining the two or more search result sets, based on a weighted ranking of the two or more search result sets, yielding a combined search result set, the weighted ranking obtained based on the determined weights and the associated scores for the two or more search result sets; and
transmitting a signal to cause a display of the user device to provide output based on the combined search result set.

2. The method of claim 1, wherein the machine learning model has been trained to predict a set of weights corresponding to the two or more embedding generators, based on the search query.

3. The method of claim 1, further comprising:
prior to determining weights for the two or more search result sets:
training the machine learning model using a training dataset comprising:
historical queries and corresponding optimal embedding generator weighting factors associated with respective embedding generators of a plurality of embedding generators.

4. The method of claim 3, further comprising:
generating the training dataset by:
obtaining a plurality of historical search queries, each of the historical search queries being associated with at least one historically interacted-with search result;
for each historical search query of the plurality of historical search queries:
performing a plurality of test searches, each test search performed using candidate weight values for the respective embedding generators;
determining, for each of the plurality of test searches, a ranking of the historically interacted-with search result in a respective set of returned test search results; and
determining the optimal embedding generator weighting factors, based on the ranking.

5. The method of claim 1, wherein the two or more query embeddings include:
a textual query embedding generated by encoding the search query using a textual embedding generator; and
an image query embedding generated by encoding the search query using a multimodal embedding generator.

6. The method of claim 5, wherein generating the two or more search result sets comprises:
generating a first set of candidates, based on a similarity between the textual query embedding and a plurality of stored text embeddings; and
generating a second set of candidates, based on a similarity between the image query embedding and a plurality of stored image embeddings, wherein the first set of search results comprises the first set of candidates and the second set of candidates.

7. The method of claim 6, wherein combining the two or more search result sets comprises:
for candidates represented in the first set of candidates, multiplying corresponding text embedding similarity scores with a textual embedding generator weighting factor to generate corresponding weighted text embedding similarity scores;
for candidates represented in the second set of candidates, multiplying corresponding image embedding similarity scores with a multimodal embedding generator weighting factor to generate corresponding weighted image embedding similarity scores;
for candidates represented in both the first set of candidates and the second set of candidates, adding corresponding weighted text embedding similarity scores and corresponding weighted image embedding similarity scores, to generate corresponding weighted text-image embedding similarity scores; and
ranking the first set of candidates and the second set of candidates based on the weighted text embedding similarity scores, the weighted image embedding similarity scores and the weighted text-image embedding similarity scores, to obtain the combined search result set.

8. The method of claim 7, wherein ranking the first set of candidates and the second set of candidates comprises:

ordering the first set of candidates and the second set of candidates based on the weighted text embedding similarity scores, the weighted image embedding similarity scores and the weighted text-image embedding similarity scores, wherein candidates that are present in both the first set of candidates and the second set of candidates are ordered based on the corresponding weighted text-image embedding similarity scores, and candidates that are present in either of but not both of the first set of candidates or the second set of candidates are ordered based on either the corresponding weighted text embedding similarity scores or the corresponding weighted image embedding similarity scores; and ranking the candidates in the combined search result set based on the ordering, where higher rankings are associated with higher similarity scores, wherein the combined search result set comprises a pre-determined number of the highest-ranking candidates.

9. The method of claim 1, wherein the output is provided as a list of search results, the method further comprising:

receiving a search modifier associated with the search query, from the user device;

determining, using the machine learning model, a set of updated weights based on the search query and the search modifier; and modifying the list of search results, based on the first set of search results and the set of updated weights.

10. The method of claim 9, wherein the search modifier is at least one of:

a category;
a filter;
a metadata related to a user search session; or
a metadata related to a user account.

11. A computer system comprising:

a processing unit configured to execute computer-readable instructions to cause the system to:

receive, from a user device, a search query;

obtain two or more query embeddings based on the search query, the two or more query embeddings being generated by corresponding two or more embedding generators;

generate, by two or more search operators, two or more corresponding search result sets having search results and associated scores, based on the two or more query embeddings, wherein each of the two or more search operators is associated with a respective one of the two or more embedding generators;

determine, using a machine learning model, weights for each of the two or more search result sets, based on the search query and the two or more embedding generators;

combine the two or more search result sets based on a weighted ranking of the two or more search result sets, yielding a combined search result set, the weighted ranking obtained based on the determined weights and the associated scores for the two or more search result sets; and transmit a signal to cause a display of the user device to provide output based on the combined search result set.

12. The computer system of claim 11, wherein the machine learning model has been trained to predict a set of weights corresponding to the two or more embedding generators, based on the search query.

13. The computer system of claim 11, wherein the processing unit is further configured to execute computer-readable instructions to cause the computer system to, prior to determining weights for the two or more search result sets:

train the machine learning model using a training dataset comprising:

historical queries and corresponding optimal two or more embedding generator weighting factors associated with respective embedding generators of a plurality of embedding generators.

14. The computer system of claim 13, wherein the processing unit is further configured to execute computer-readable instructions to cause the computer system to:

generate the training dataset by:

obtaining a plurality of historical search queries, each of the historical search queries being associated with at least one historically interacted-with search result;

for each historical search query of the plurality of historical search queries:

performing a plurality of test searches, each test search performed using candidate weight values for the respective embedding generators;

determining, for each of the plurality of test searches, a ranking of the historically interacted-with search result in a respective set of returned test search results; and determining the optimal embedding generator weighting factors, based on the ranking.

15. The computer system of claim 11, wherein the two or more query embeddings include:

a textual query embedding generated by encoding the search query using a textual embedding generator; and an image query embedding generated by encoding the search query using a multimodal embedding generator.

16. The computer system of claim 15, wherein in generating the two or more search result sets, the processing unit is further configured to execute computer-readable instructions to cause the computer system to:

generate a first set of candidates, based on a similarity between the textual query embedding and a plurality of stored text embeddings; and generate a second set of candidates, based on a similarity between the image query embedding and a plurality of stored image embeddings, wherein the first set of search results comprises the first set of candidates and the second set of candidates.

17. The computer system of claim 16, wherein in combining the two or more search result sets, the processing unit is further configured to execute computer-readable instructions to cause the computer system to:

for candidates represented in the first set of candidates, multiply corresponding text embedding similarity scores with a textual embedding generator weighting factor to generate corresponding weighted text embedding similarity scores;

for candidates represented in the second set of candidates, multiply corresponding image embedding similarity scores with a multimodal embedding generator weighting factor to generate corresponding weighted image embedding similarity scores;

for candidates represented in both the first set of candidates and the second set of candidates, add corresponding weighted text embedding similarity scores and corresponding weighted image embedding similarity scores, to generate corresponding weighted text-image embedding similarity scores; and rank the first set of candidates and the second set of candidates based on the weighted text embedding similarity scores, the weighted image embedding similarity scores and the weighted text-image embedding similarity scores, to obtain the combined search result set.

18. The computer system of claim 17, wherein in ranking the first set of candidates and the second set of candidates, the processing unit is further configured to execute computer-readable instructions to cause the computer system to:
   order the first set of candidates and the second set of candidates based on the weighted text embedding similarity scores, the weighted image embedding similarity scores and the weighted text-image embedding similarity scores, wherein candidates that are present in both the first set of candidates and the second set of candidates are ordered based on the corresponding weighted text-image embedding similarity scores, and candidates that are present in either of but not both of the first set of candidates or the second set of candidates are ordered based on either the corresponding weighted text embedding similarity scores or the corresponding weighted image embedding similarity scores; and
   rank the candidates in the combined search result set based on the ordering, where higher rankings are associated with higher similarity scores, wherein the combined search result set comprises a pre-determined number of the highest-ranking candidates.

19. The computer system of claim 11, wherein the output is provided as a list of search results, and the processing unit is further configured to execute computer-readable instructions to cause the computer system to:
   receive a search modifier associated with the search query, from the user device;
   determine, using the machine learning model, a set of updated weights based on the search query and the search modifier; and
   modify the list of search results, based on the first set of search results and the set of updated weights.

20. A non-transitory computer-readable medium storing instructions that, when executed by a processing unit of a computing system, cause the computing system to:
   receive, from a user device, a search query;
   obtain two or more query embeddings based on the search query, the two or more query embeddings being generated by corresponding two or more embedding generators;
   generate, by two or more search operators, two or more corresponding search result sets having search results and associated scores, based on the two or more query embeddings, wherein each of the two or more search operators is associated with a respective one of the two or more embedding generators;
   determine, using a machine learning model, weights for each of the two or more search result sets, based on the search query and the two or more embedding generators;
   combine the two or more search result sets based on a weighted ranking of the two or more search result sets, yielding a combined search result set, the weighted ranking obtained based on the determined weights and the associated scores for the two or more search result sets; and
   transmit a signal to cause a display of the user device to provide output based on the combined search result set.

* * * * *